United States Patent
Roby et al.

(10) Patent No.: US 9,969,489 B2
(45) Date of Patent: May 15, 2018

(54) HYBRID SPINNER SUPPORT

(71) Applicant: General Electric Company, Schenectady, NY (US)

(72) Inventors: Benjamin James Roby, Fairfield, OH (US); Michael Jason Bishop, Mason, OH (US)

(73) Assignee: General Electric Company, Schenectady, NY (US)

( * ) Notice: Subject to any disclaimer, the term of this patent is extended or adjusted under 35 U.S.C. 154(b) by 903 days.

(21) Appl. No.: 13/763,228

(22) Filed: Feb. 8, 2013

(65) Prior Publication Data

US 2014/0255203 A1 Sep. 11, 2014

(51) Int. Cl.
*F01D 25/24* (2006.01)
*B64C 11/14* (2006.01)
(Continued)

(52) U.S. Cl.
CPC .............. *B64C 27/54* (2013.01); *F01D 5/066* (2013.01); *F01D 25/243* (2013.01); *F02C 7/04* (2013.01); *F04D 29/023* (2013.01); *F04D 29/321* (2013.01); *F05D 2220/36* (2013.01); *F05D 2300/121* (2013.01); *F05D 2300/133* (2013.01); *F05D 2300/171* (2013.01);
(Continued)

(58) Field of Classification Search
CPC . B64C 11/14; B64C 7/02; B64C 27/54; F05D 2300/603; F05D 2300/6034; F05D 2300/121; F05D 2300/133; F05D 2250/232; F05D 2300/171; F05D 2220/36; F01D 5/143; F01D 25/24; F01D 25/243; F01D 25/246; F01D 5/066; F02C 7/04; F04D 29/023; F04D 29/321; Y02T 50/672; Y02T 50/673

See application file for complete search history.

(56) References Cited

U.S. PATENT DOCUMENTS 2,346,680 A * 4/1944 Elwood .................... B64C 11/14
  416/245 R
2,401,247 A * 5/1946 Hunter ..................... B64C 11/14
  219/202
(Continued)

FOREIGN PATENT DOCUMENTS

CN      102102588 A    6/2011
CN      102116175 A    7/2011
(Continued)

OTHER PUBLICATIONS

PCT Search Report and Written Opinion issued in connection with corresponding Application No. PCT/US2014/012233 dated Jun. 6, 2014.
(Continued)

*Primary Examiner* — Logan Kraft
*Assistant Examiner* — Joshua R Beebe
(74) *Attorney, Agent, or Firm* — General Electric Company; Brian P. Overbeck

(57) ABSTRACT

A hybrid support ring comprises a suspender and a belt, the suspender defined by a flange and a leg rearwardly extending having a lug, the suspender also extending circumferentially, the suspender formed of a first material, the belt extending circumferentially and disposed in the lug, the belt being formed of a second material.

6 Claims, 7 Drawing Sheets

(51) Int. Cl.
  *B64C 27/54*  (2006.01)
  *F01D 5/06*  (2006.01)
  *F02C 7/04*  (2006.01)
  *F04D 29/02*  (2006.01)
  *F04D 29/32*  (2006.01)

(52) U.S. Cl.
  CPC ....... *F05D 2300/603* (2013.01); *Y02T 50/672* (2013.01); *Y02T 50/673* (2013.01)

(56) References Cited

U.S. PATENT DOCUMENTS

| | | | | |
|---|---|---|---|---|
| 3,990,814 | A * | 11/1976 | Leone | B64C 7/02 416/245 R |
| 4,699,568 | A * | 10/1987 | Harlamert | B64D 15/12 416/155 |
| 5,018,795 | A * | 5/1991 | Engerand | B29D 99/0032 152/410 |
| 5,833,435 | A * | 11/1998 | Smith | F02C 7/04 156/153 |
| 6,059,524 | A * | 5/2000 | Costa | F01D 21/045 415/200 |
| 6,942,462 | B2 * | 9/2005 | Breakwell | B64C 11/14 416/245 R |
| 8,807,931 | B2 | 8/2014 | Roberts | |
| 8,876,042 | B2 | 11/2014 | Lachapelle et al. | |
| 2004/0211167 | A1 * | 10/2004 | Schreiber | F01D 21/045 60/226.1 |
| 2006/0213174 | A1 * | 9/2006 | Wu | F16G 5/20 57/237 |
| 2008/0022524 | A1 | 1/2008 | Schreiber | |
| 2009/0269202 | A1 | 10/2009 | Borzakian et al. | |
| 2010/0051112 | A1 | 3/2010 | Dieling | |
| 2010/0051157 | A1 * | 3/2010 | Botts | B60C 9/0042 152/458 |
| 2010/0258199 | A1 * | 10/2010 | Schreiber | F02C 7/04 137/15.1 |
| 2011/0103726 | A1 * | 5/2011 | Xie | F01D 5/06 384/295 |
| 2012/0036827 | A1 * | 2/2012 | Delapierre | F02C 6/206 60/39.093 |

FOREIGN PATENT DOCUMENTS

| | | |
|---|---|---|
| DE | 102009053000 A1 | 7/2011 |
| EP | 1227036 A2 | 7/2002 |
| EP | 2458146 A1 | 5/2012 |
| GB | 2363170 A | 12/2001 |

OTHER PUBLICATIONS

Unofficial English translation of Chinese Office Action issued in connection with corresponding CN Application No. 201480007961.3 dated Dec. 23, 2015.

Unofficial English Translation of Japanese office action issued in connection with corresponding JP Application No. 2015556953 dated Sep. 6, 2016.

Unofficial English Translation of Chinese office action issued in connection with corresponding CN Application No. 201480007961.3 dated Sep. 23, 2016.

* cited by examiner

HYBRID SPINNER SUPPORT

CROSS-REFERENCE TO RELATED APPLICATIONS

None

BACKGROUND

The disclosed embodiments generally pertain to fan sections of an aircraft engine. More particularly, but not by way of limitation, the present embodiments relate to hybrid aircraft components formed of two or more parts of differing composition.

A typical gas turbine engine generally possesses a forward end and an aft end with its several core or propulsion components positioned axially therebetween. An air inlet or intake is at a forward end of the engine. Moving toward the aft end, in order, the intake is followed by a compressor, a combustion chamber, a turbine, and a nozzle at the aft end of the engine. It will be readily apparent from those skilled in the art that additional components may also be included in the engine, such as, for example, low-pressure and high-pressure compressors, and high-pressure and low-pressure turbines. This, however, is not an exhaustive list. An engine also typically has an internal shaft axially disposed along a center longitudinal axis of the engine. The internal shaft is connected to both the turbine and the air compressor, such that the turbine provides a rotational input to the air compressor to drive the compressor blades.

In operation, air is pressurized in a compressor and mixed with fuel in a combustor for generating hot combustion gases which flow downstream through turbine stages. These turbine stages extract energy from the combustion gases. A high pressure turbine first receives the hot combustion gases from the combustor and includes a stator nozzle assembly directing the combustion gases downstream through a row of high pressure turbine rotor blades extending radially outwardly from a supporting rotor disk. In a two stage turbine, a second stage stator nozzle assembly is positioned downstream of the first stage blades followed in turn by a row of second stage rotor blades extending radially outwardly from a second supporting rotor disk. The turbine converts the combustion gas energy to mechanical energy. The second stage turbine blades and rotor disk are mechanically coupled to a low pressure or booster compressor for driving the booster compressor and additionally an inlet fan.

It is always desirable to reduce the weight of a gas turbine engine and its related components, especially for those utilized in the aviation industry. Within the fan section of the engine, current support structures mounted aft of the spinner or cone are generally manufactured of titanium. Due to the use of titanium, such support structure is a relatively heavy material and also expensive. It would be desirable to replace this titanium material with a less expensive and lighter weight material without affecting the hoop load characteristics of the support ring. However, such spinner support ring cannot be manufactured from a single material of lower density, such as aluminum, due to material limitations or capabilities. Thus, while it would be desirable to reduce the cost and weight of the support ring, it is also necessary to maintain the load carrying capability of the titanium part being replaced.

As may be seen by the foregoing, it would be desirable to overcome these and other deficiencies with gas turbine engine components.

SUMMARY

According to present embodiments, a hybrid spinner support ring is disclosed which utilizes a first material to define a first portion of the support ring and utilizes a second material which is distinct from the first material to define a second portion of the support ring. The at least two portions of the support ring define the hybrid components of the distinct materials.

According to some embodiments, a hybrid support ring for an aircraft engine comprises a suspender and a belt seated in said suspender, a forward flange extending radially and circumferentially, a flow surface having an axial component and extending circumferentially, the flow surface having a first radial location at a first forward end and a second radial location at a second rearward end, the belt extending circumferentially in and engaging a groove of the suspender, the suspender being formed of a first material and the belt being formed of a second distinct material, the flow surface being one of smooth or contoured.

According to some embodiments, a hybrid support ring comprises a flange support and a rearwardly extending leg, the leg having a lug including a groove and a belt, the belt disposed in the groove so that the lug comprises first and second materials, the first material being formed of aluminum, the second material being material other than aluminum.

According to some embodiments, a hybrid support ring comprises a suspender and a belt, the suspender defined by a flange and a leg rearwardly extending having a lug, the suspender also extending circumferentially, the suspender formed of a first material, the belt extending circumferentially and disposed in the lug, the belt being formed of a second material.

All of the above outlined features are to be understood as exemplary only and many more features and objectives of the invention may be gleaned from the disclosure herein. Therefore, no limiting interpretation of this summary is to be understood without further reading of the entire specification, claims, and drawings included herewith.

BRIEF DESCRIPTION OF THE ILLUSTRATIONS

Embodiments of the invention are illustrated in the following illustrations.

DETAILED DESCRIPTION

Figure 1:
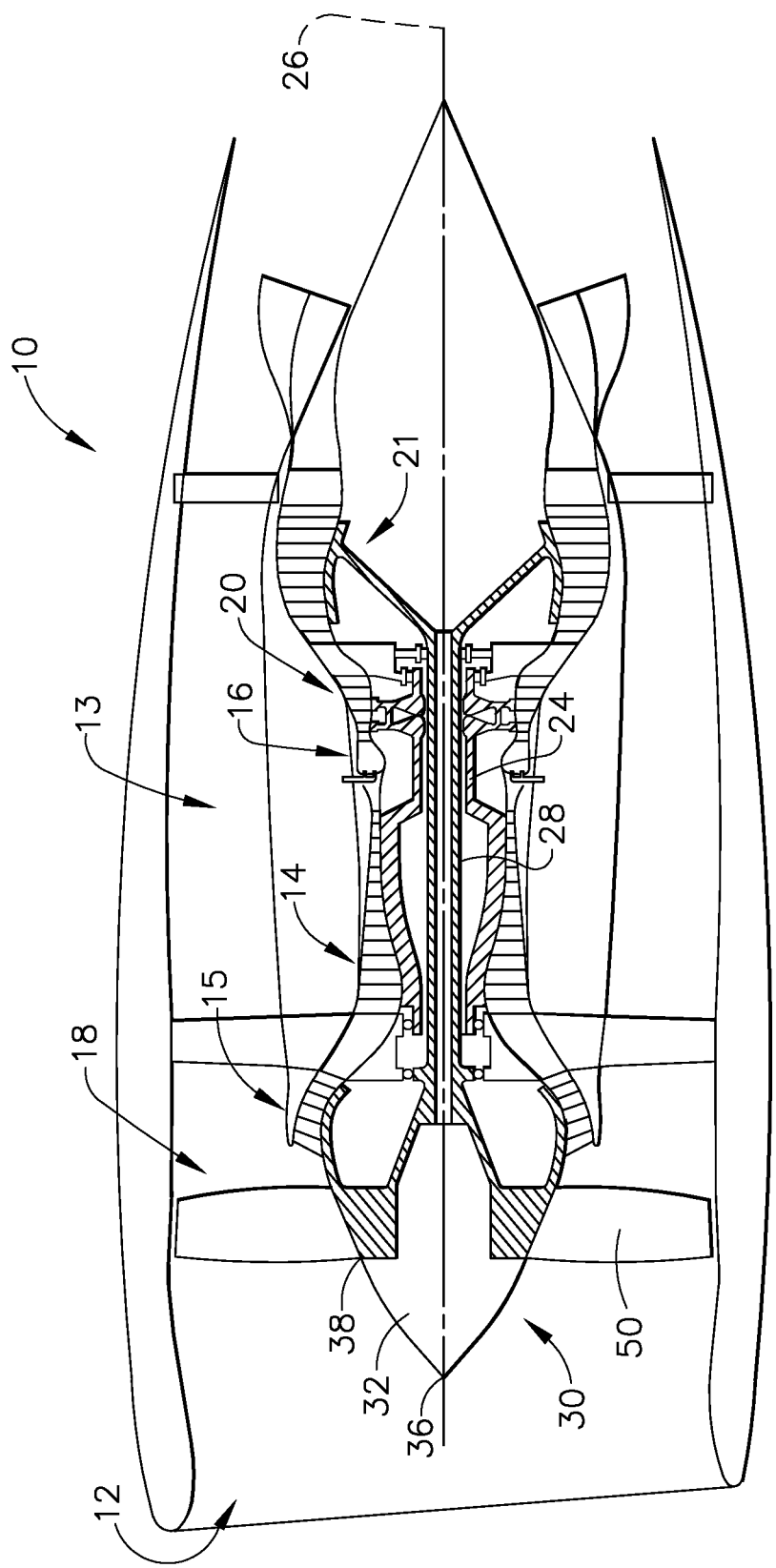
FIG. 1 is a side section view of a gas turbine engine.

Reference now will be made in detail to embodiments provided, one or more examples of which are illustrated in the drawings. Each example is provided by way of explanation, not limitation of the disclosed embodiments. In fact, it will be apparent to those skilled in the art that various modifications and variations can be made in the present embodiments without departing from the scope or spirit of the disclosure. For instance, features illustrated or described as part of one embodiment can be used with another embodiment to still yield further embodiments. Thus it is intended that the present invention covers such modifications and variations as come within the scope of the appended claims and their equivalents.

Referring to FIGS. 1-10 various embodiments of hybrid spinner support structures are shown. More specifically, the hybrid spinner supports are provided such that a first portion of the support is formed of a first material and a second portion of the support is formed of a second material, and further wherein the first and second materials are different materials. The hybrid support structure decreases the cost and weight of the fan section engine component while maintaining necessary strength requirements of the component.

As used herein, the terms "axial" or "axially" refer to a dimension along a longitudinal axis of an engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to moving in a direction toward the engine nozzle, or a component being relatively closer to the engine nozzle as compared to another component.

As used herein, the terms "radial" or "radially" refer to a dimension extending between a center longitudinal axis of the engine and an outer engine circumference. The use of the terms "proximal" or "proximally," either by themselves or in conjunction with the terms "radial" or "radially," refers to moving in a direction toward the center longitudinal axis, or a component being relatively closer to the center longitudinal axis as compared to another component. The use of the terms "distal" or "distally," either by themselves or in conjunction with the terms "radial" or "radially," refers to moving in a direction toward the outer engine circumference, or a component being relatively closer to the outer engine circumference as compared to another component.

As used herein, the terms "lateral" or "laterally" refer to a dimension that is perpendicular to both the axial and radial dimensions.

Referring initially to FIG. 1, a schematic side section view of a gas turbine engine 10 is shown having an engine inlet end 12 wherein air enters the propulsor or core 13 which is defined generally by a compressor 14, a combustor 16 and a multi-stage high pressure turbine 20. Collectively, the propulsor 13 provides thrust or power during operation. Although the gas turbine 10 is shown in an aviation embodiment, such example should not be considered limiting as the gas turbine 10 may be used for aviation, power generation, industrial, marine or the like.

In operation air enters through the air inlet end 12 of the engine 10 and moves through at least one stage of compression where the air pressure is increased and directed to the combustor 16. The compressed air is mixed with fuel and burned providing the hot combustion gas which exits the combustor 16 toward the high pressure turbine 20. At the high pressure turbine 20, energy is extracted from the hot combustion gas causing rotation of turbine blades which in turn cause rotation of the shaft 24. The shaft 24 passes toward the front of the engine to continue rotation of the one or more compressor stages 14, a turbofan 18 or inlet fan blades, depending on the turbine design. The turbofan 18 is connected by the shaft 28 to a low pressure turbine 21 and creates thrust for the turbine engine 10. A low pressure turbine 21 may also be utilized to extract further energy and power additional compressor stages. The low pressure air may be used to aid in cooling components of the engine as well.

The gas turbine 10 is axis-symmetrical about engine axis 26 or shaft 24 so that various engine components rotate thereabout. The axis-symmetrical shaft 24 extends through the turbine engine forward end into an aft end and is journaled by bearings along the length of the shaft structure. The shaft rotates about a centerline 26 of the engine 10. The shaft 24 may be hollow to allow rotation of a low pressure turbine shaft 28 therein and independent of the shaft 24 rotation. Shafts 28 also may rotate about the centerline axis 26 of the engine. During operation the shaft 28 rotates along with other structures connected to the shaft such as the rotor assemblies of the turbine in order to create power or thrust for various types of turbines used in power and industrial or aviation areas of use.

At the forward end 12 of the engine 10, forward of the turbo fan blades 18 is a fan section 30 including a nose cone or spinner 32. The spinner 32 is generally attached to a fan hub in a variety of fashions including but not limited to a number of circumferentially spaced bolts. The spinner 32 provides a smooth flow of air to the core or radially inner portions of the fan 18. Smoothing of the airflow increases efficiency of the engine 10 and therefore improves performance not only of the fan 18, but of downstream components as well. For example, the spinner 32 shape may reduce drag, correct velocity profile into the core, reduce turbulence into the core, as well as provide a means for shedding ice and/or deflect foreign objects toward the fan/bypass ducts rather than allowing passage through the core, which can damage engine components. Further, the spinner 32 may also absorb impact of foreign objects in order to limit or inhibit damage caused by such foreign objects.

Referring still to the fan section 30 of the engine 10, the spinner 32 is generally formed of a conical shaped sidewall 34 which is generally continuous. The conical shaped sidewall 34 tapers from a first end 36 (FIG. 1) to a larger second end 38. The sidewall 32 may be linear moving from the larger end of the cone to the smaller end of the cone. Alternatively, the sidewall 32 may be curvilinear between first and second ends 36, 38. As still a further alternative, the geometry may have varying thickness of features to provide a 3-dimensional geometry, including but not limited to the exemplary aero-features shown in FIG. 3. The spinner 32 is symmetrical about the axis 34, shown in broken line. The spinner 32 is generally hollow to reduce weight and is capable of receiving bolts, fixtures or other components of the fan hub (not shown).

At the forward end 12 of the engine 10, the engine temperatures are lower than in the core 13, which permits the use of PMC materials, steel, aluminum and the like for the spinner 32. The spinner 32 has significant loading requirements. Design characteristics include, for example, aerodynamic loading, high speed revolution fatigue and foreign object strikes.

Figure 2:
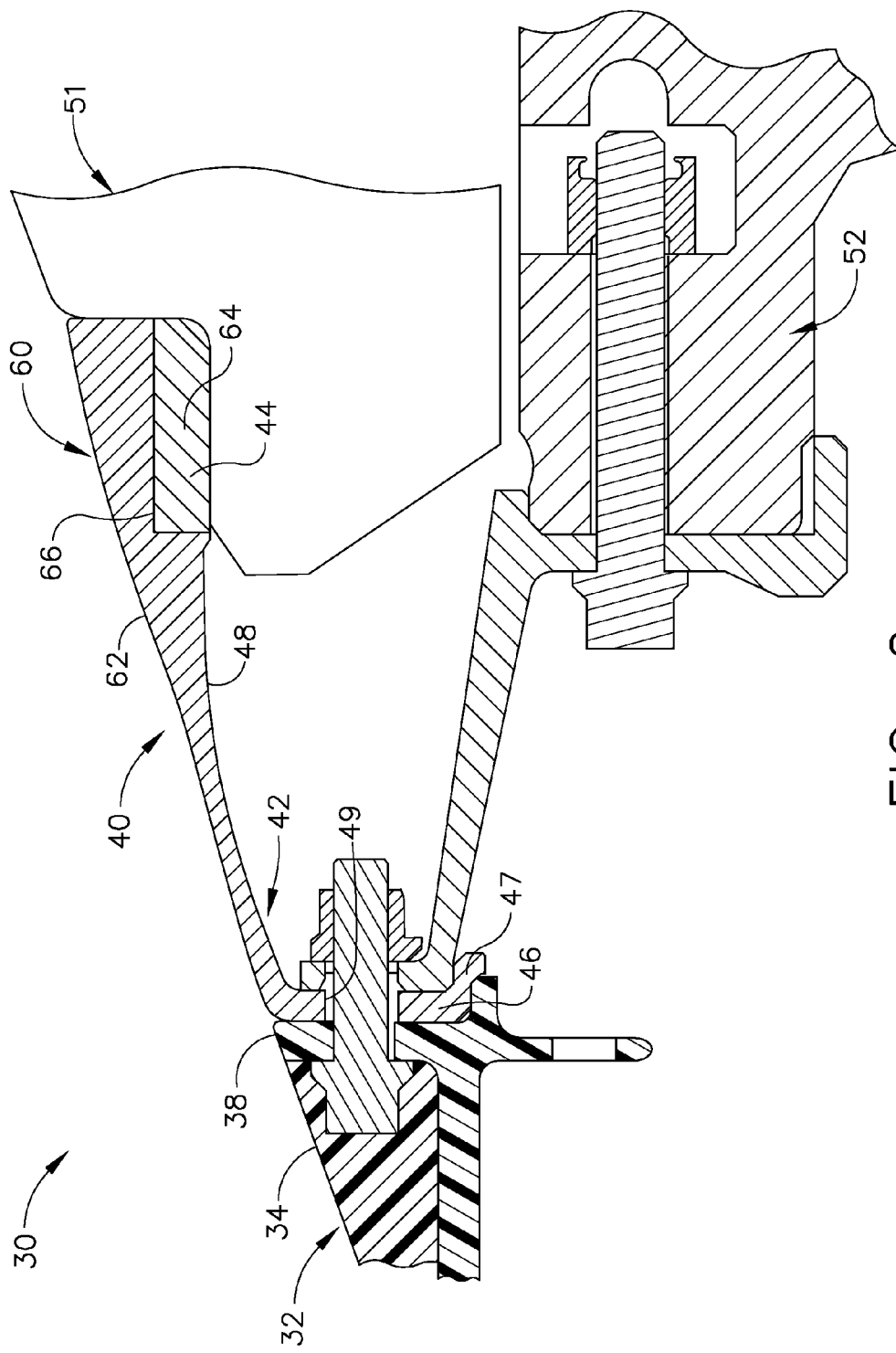
FIG. 2 is a side section view of a fan section including an exemplary support ring.

Referring now to FIG. 2, an exemplary fan section 30 is depicted in section view. The fan section 30 of the gas turbine engine 10 is of the type for powering an aircraft for example. Components of the fan section 10 include a plurality of circumferentially spaced fan blades 50 (FIG. 1) mounted to a fan rotor disk 52 and a fan platform 51 circumferentially located between the blades 50. The radially outer surface of the platform 51 defines part of the flow path for air between the fan blades 50 at the radially inner end of the blade. Additionally, downstream of the fan section 30 (but not shown) is a vane and a blade utilized with a booster or low pressure compressor 15 (FIG. 1). The compressor blades are mounted to the shaft 28 which extends from the low pressure turbine 21 and may also couple to the fan rotor disk 52.

A support ring 40 is depicted in the fan section 30 of a high-bypass gas turbine engine 10. The spinner or nose cone 32 is mounted forward of the rotor disk 52 and aids to provide a smooth flow to the radially inner portion of the fan blade 50. At the aft end 38 of the spinner 32 is a support ring 40 which extends circumferentially about the axis of the engine 10. The support ring 40 extends between the spinner 32 and the fan blade 50. The support ring 40 may be formed as a single assembly or may be defined by a plurality of circumferential segments and in either embodiment provides a flow path for air moving from the spinner 32 toward the radially inward portion of the fan blades 50. The support ring 40 also provides an attachment for the spinner 32.

According to the instant embodiment, the aft support ring 40 is generally circular in cross-section and axi-symmetrical with the axis 26. According to some embodiments, the aft support ring 40 includes a first portion or suspender 42 and a second portion or belt 44. The first portion or suspender 42 includes a flange 46 at a forward end and a leg 48 extending aft from the flange 46. The flange 46 includes a plurality of fastening apertures 49 through which the aft support ring 40 may be connected to the aft end 38 of the spinner 32. The leg 48 improves aerodynamic flow of the air leaving the spinner 32 and moving across the aft support ring 40 from the forward end toward the aft end of the ring 40.

At the aft end of the leg 48 is a lug 60 which is thickened in an axial aft direction compared to the forward portions of the leg 48 and may or may not be contoured. The lug 60 is formed of at least two materials which define two separate materials 62, 64. The first material 62 of the lug 60 is integrally formed with the leg 48. The second material 64, which is distinct from the first material 62, defines the belt 44. The contours 43 (FIG. 3) improve airflow across the aft support ring 40. These contours 43 may extend axially or be curved in the forward to aft direction.

The lug 60 includes a groove 66 wherein the belt 44 engages the leg 48. The groove 66 receives the belt 44 of the hybrid support ring 40. The belt 44 may be fit in a variety of manners. For example, the belt 44 may press fit or interference fit to maintain engagement with the suspender portion 42 of the hybrid support ring 40. As an alternative, a key and keyway may be suitable for joining the belt 44 in the lug 60 to limit relative circumferential movement between parts. Other structures could also be used to join the parts.

Figure 3:
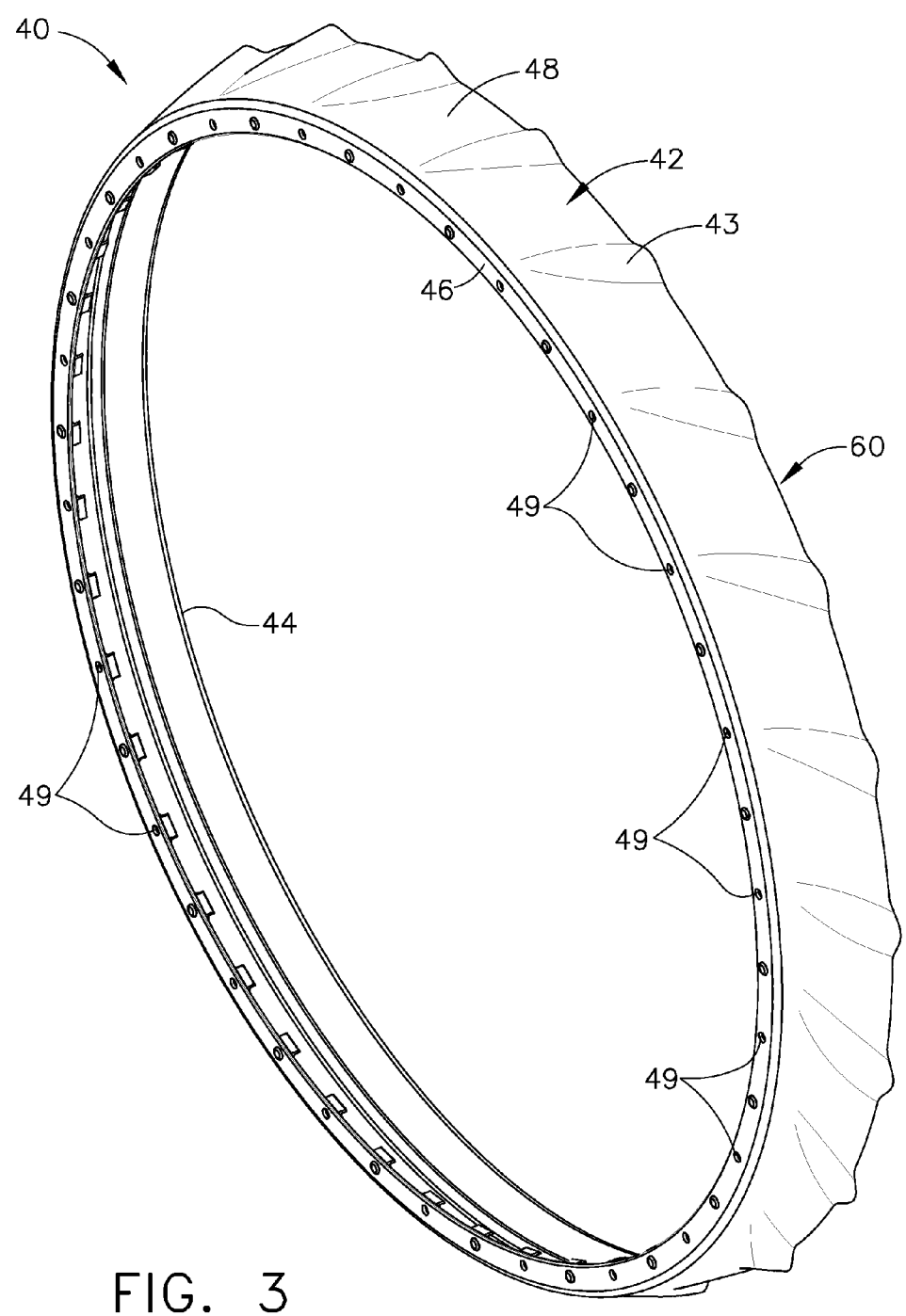
FIG. 3 is a perspective view of an exemplary support ring removed from the fan section of the gas turbine engine.

Referring now to FIG. 3, the support ring 40 is shown in perspective view. The support ring 40 comprises the suspender 42 and the belt 44. The suspender 42 is defined by the flange 46 and the leg 48. Starting at the forward end of the part, the flange 46 extends in a radial direction and circumferentially about the axis 26 of the engine 10. At a lower or radially inward end of the flange 46 is a lip 47 (FIGS. 2, 4) which serves as a locating feature for assembly. The flange 46 includes an aperture 49 for bolted connection of the support ring 40 to the adjacent structure, such as a spinner or nose cone 32.

Extending rearwardly from the radially outward end of the flange 46 is the leg 48 such that the suspender 42 is defined by the flange 46 and leg 48. The leg 48 extends rearward and includes an axial component and a radial component so that the leg 48 starts at a first radial position at the flange 46 and moves radially outward toward the second aft end of the part. This shape defines a frusto-conical surface for the leg 48 of the support ring 40. The suspender 42 may have a uniformly smooth outer flow surface or may be contoured to improve aerodynamic performance as shown in FIG. 3.

Figure 4:
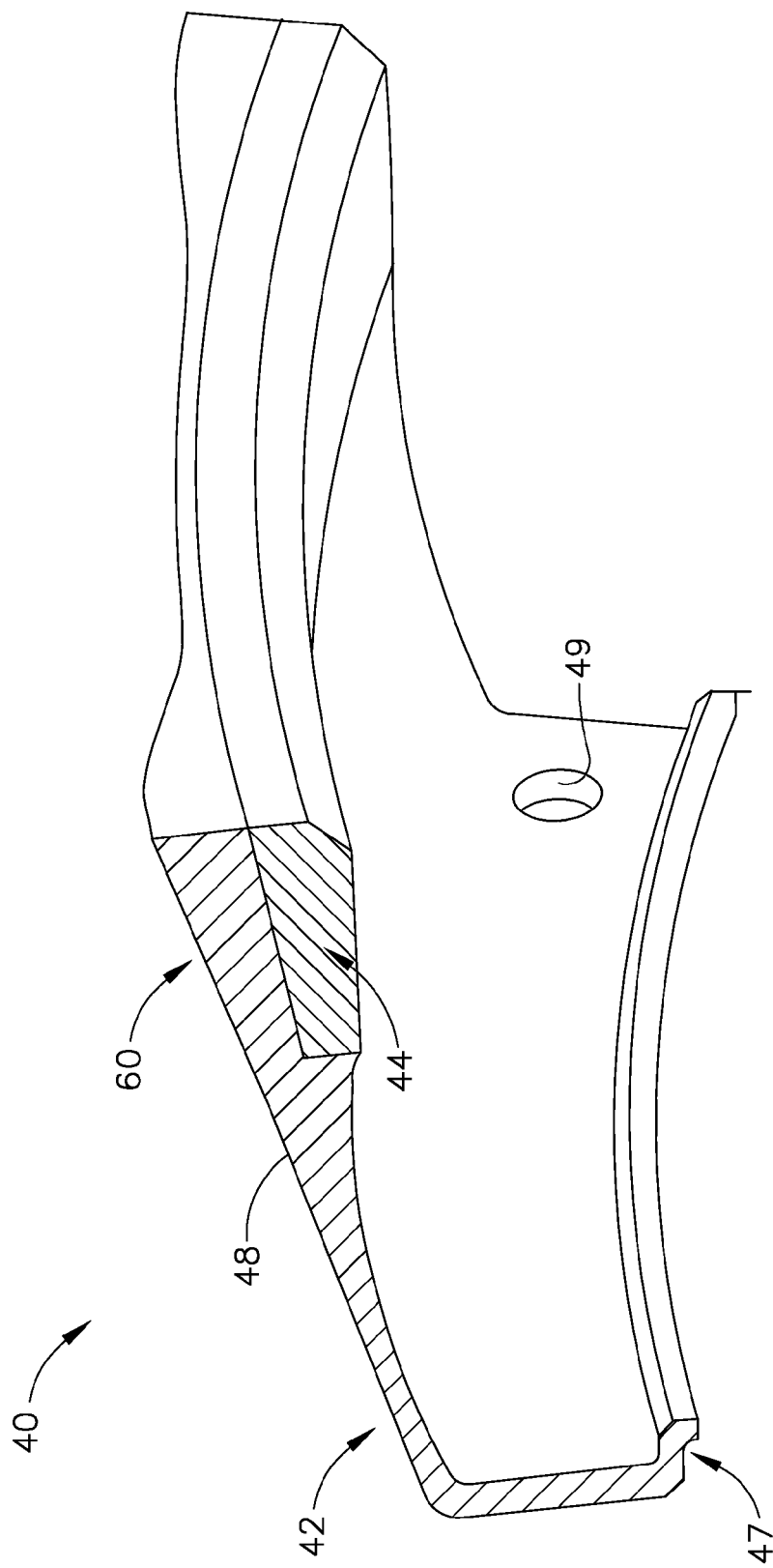
FIG. 4 is a sectioned perspective view of an exemplary support ring.

With reference additionally now to FIG. 4, the ring 40, is shown in perspective view. More specifically, the leg 48 includes a lug 60 toward an aft end of the ring 40. The lug 60 is a thickened portion defined by the first material of the suspender 42 and the second material and structure defining the belt 44. The first and second materials are utilized in first and second structures, respectively and therefore are distinct.

According to the instant embodiment, the belt 44 is positioned radially inward of the lug 60. The belt 44 may be formed of various cross-sectional shapes including rectangular, polygonal and other shapes. Thus, the five sided structure depicted should not be considered limiting. The shape may be dependent upon the taper of the radially outer surface of the leg 48, the radially inner surface of the leg 48 or adjacent structure. Additionally, the shape may be dependent upon the location of the belt 44 within the lug 60.

As discussed previously, the belt 44 and the suspender 42 are two distinct structures each formed of different materials. According to some non-limiting examples, the suspender 42 is formed of an aluminum based material, for example AL7075. Additionally, other materials may be utilized such as titanium, steel or composite material for example. According to some examples, the belt 44 may be formed of various materials including but not limited to stainless steel, such as 316 stainless steel, titanium, titanium based alloy, or wrapped composite. Such composite may be continuous wrapped, chopped fiber or a combination thereof.

The outer surface of the hybrid support ring may include a skin or coating to protect the structure from erosion caused by particles and other foreign objects entering the inlet 12 of the gas turbine engine 10. The skin or coating may be various materials, including but not limited to polyurethane and may extend circumferentially throughout the circumferential revolution defined by the hybrid support ring.

A composite belt 44 may be formed by laying up continuous fiber portions. Composite materials generally comprise a fibrous reinforcement material embedded in matrix material, such as polymer or ceramic material. The reinforcement material serves as a load-bearing constituent of the composite material, while the matrix of a composite material serves to bind the fibers together, and also acts as the medium by which an externally applied stress is transmitted and distributed to the fibers. Many polymer matrix composite (PMC) materials are fabricated with the use of prepreg, which is a fabric or unidirectional tape that is impregnated with resin. Multiple layers of prepreg are stacked to the proper thickness and orientation for the part, and then the resin is cured and solidified to render a fiber reinforced composite part. However, other materials may be suitable as well. Resins for matrix materials of PMCs can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific example of high performance thermoplastic resins that have been contemplated for use in aerospace applications include, polyetheretherketone (PEEK), polyetherketoneketone (PEKK), polyetherimide (PEI) and polyphenylene sulfide (PPS). In contrast, once fully cured into a hard rigid solid, thermoset resins do not undergo significant softening when heated, but instead thermally decompose when sufficiently heated. Notable examples of thermoset resins include epoxy, bismaleimide (BMI), and polyimide resins.

A variety of fibrous reinforcement materials have been used in PMCs, for example, carbon (e.g., AS4), glass (e.g., S2), polymer (e.g., Kevlar®), ceramic (e.g. Nextel®) and metal fibers. Fibrous reinforcement materials can be used in the form of relatively short chopped fibers, generally less than two inches in length, and more preferably less than one inch, or long continuous fibers, the latter of which are often used to produce a woven fabric or unidirectional tape. PMC materials can be produced by dispersing dry fibers into a mold, and then flowing matrix material around the reinforcement fibers, or by using prepreg as previously described.

Whether a PMC material is suitable for a given application depends on its matrix and reinforcement materials, the requirements of the particular application, and the feasibility of fabricating a PMC article having the required geometry. Due to their considerable potential for weight savings, various applications have been explored for PMCs in aircraft gas turbine engines. However, a challenge has been the identification of material systems that have acceptable properties yet can be produced by manufacturing methods to yield a cost-effective PMC component. In particular, it is well known that aircraft engine applications have high performance mechanical requirements, for example, strength and fatigue properties (necessitated by vibrations in the engine environment), as well as high temperature properties, chemical/fluid resistance, etc. Though considerable weight savings could be realized by fabricating engine parts from PMC materials, performance requirements as well as the size and complexity of such components have complicated the ability to produce components from these materials.

Another complication is the type of reinforcement system required by PMC materials in aircraft engine applications. Generally, to achieve the mechanical properties required for aircraft engine applications, parts would require the use of continuous fiber-reinforced PMC materials to achieve the high performance mechanical requirements (particularly strength and fatigue properties) dictated by aircraft engine applications.

The continuous fibers that are in a fabric, unidirectional tape, or braided architecture. Each of the continuous fiber portions may be rotated to a preselected angle layer by layer to achieve the strength required for the part.

According to some embodiments, the composite belt 44 may be formed of continuous wrapped fiber composite. For example, the belt 44 may be formed of unidirectional prepreg, woven fabric prepreg, a braided prepreg, or a dry reinforcement fiber with filaments or fibers of thermoplastic polymer. For example the continuous fiber material may be continuous fibers of individual fibers or fiber tows arranged parallel (unidirectional) with the matrix material, or individual fibers or fiber tows arranged to have multiple different orientations (e.g., multiple layers of unidirectional fibers or fiber tows to form bi-axial or tri-axial architecture) within the matrix material, or individual fibers or fiber tows, woven to form a mesh or fabric within the matrix material. The fibers, tows, braids, meshes or fabrics can be arranged to define a single ply within the PMC or any suitable number of plies. Particularly suitable thermoplastic matrix materials include PEEK, PEKK, PEI and PPS and particularly suitable continuous fiber reinforcement materials include carbon, glass polymer, ceramic and metal fibers. Suitable fiber content may be at least 35 percent by volume and not more than 75 percent by volume, with a preferred range believed to be about 50 to about 65 percent by volume.

According to one embodiment, the PMC material is defined in part by prepreg, which is a reinforcement material preimpregnated with a matrix material, such as thermoplastic resin desired for the matrix material. Non-limiting examples of processed for producing thermoplastic prepregs include hot melt prepregging in which the fiber reinforcement material is drawn through the molten bath of resin, and powder prepregging in which a resin is deposited onto the fiber reinforcement material (for example electrostatically) and then adhered to the fiber (for example, in an over or with the assistance of heated rollers). The prepregs can be in the form of unidirectional tapes or woven fabrics, which are then stacked on top of one another to create the number of stacked plies desired for the part. According to an alternative option, instead of using a prepreg, with the use of thermoplastic polymers it is possible to have a woven fabric that has, for example dry carbon fiber woven together with thermoplastic polymer fibers or filaments. Non-prepreg braided architectures can be made in a similar fashion. With this approach, it is possible to tailor the fiber volume of the part by dictating the relative concentrations of the thermoplastic fibers and reinforcement fibers that have been woven or braided together. Additionally, different types of reinforcement fibers can be braided or woven together in various concentrations to tailor the properties of the part. For example, glass fiber, carbon fiber, and thermoplastic fiber could all be woven together in various concentrations to tailor the properties of the part. The carbon fiber provides the strength of the system, the glass may be incorporated to enhance the impact properties, which is a design characteristic for parts located near the inlet of the engine, and the thermoplastic fibers are the matrix that will be flowed to bind the reinforcement fibers.

The ply stack may next undergo a consolidation operation, in which heat and pressure are applied to the ply stack to flow the resin and consolidate the ply stack into the part. In addition to creating parts using prepreg, an alternative approach is to lay-up dry fabric in a suitably shaped mold cavity and then infuse the dry fabric with molten resin. According to some embodiments, due to its shape, the belt 44 continuous fiber preform architecture is loaded into a compression mold.

According to some embodiments, the belt 44 is a hybrid composite formed of a first fiber type and a second fiber type wherein one type is a continuous fiber and the other type is a chopped fiber. Despite the two fiber types, the aircraft components being formed are monolithic. Further, according to any of the embodiments described herein where the belt 44 is formed of a one material or multi-material composite, the suspender 42 may define all or some portion of a mold for the belt 44.

As a result of the construction, a load-bearing part is formed which benefits from weight savings but also has requisite capability and characteristics for withstanding mechanical and environmental conditions associated with aircraft engines. Additionally, a monolithic composite belt 44 may be fabricated which can withstand high loadings yet is lighter weight and costs less than prior art support rings.

A high modulus belt 44 is press fit or interference fit into the aluminum, or other materials, defining the suspender 42.

This high modulus belt 44 may be manufactured from composite or other high modulus material to accept the loading from the fan blade platforms. By accommodating such loading through the high modulus belt 44, this allows for the suspender 42 to be manufactured from a less expensive lighter weight material such as aluminum.

Figure 5:
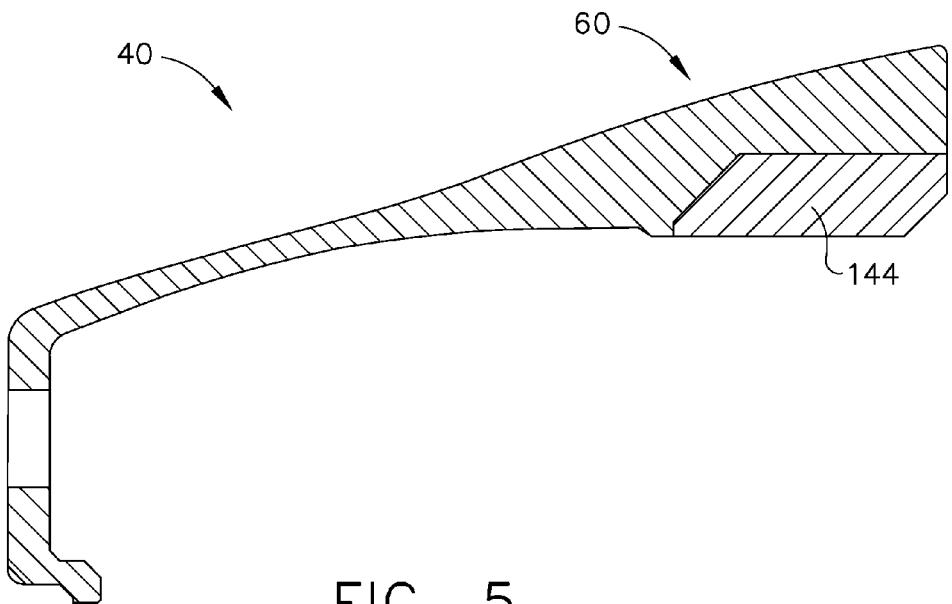
FIG. 5 is a side view of one embodiment of the support ring.

Referring now to FIG. 5, one embodiment of the support ring 40 is provided in side-section view. The embodiment depicts that the belt 144 is mounted radially inwardly in the lug 60. Additionally, the belt 144 is shown with an alternative cross-sectional shape than in prior embodiments.

Figure 6:
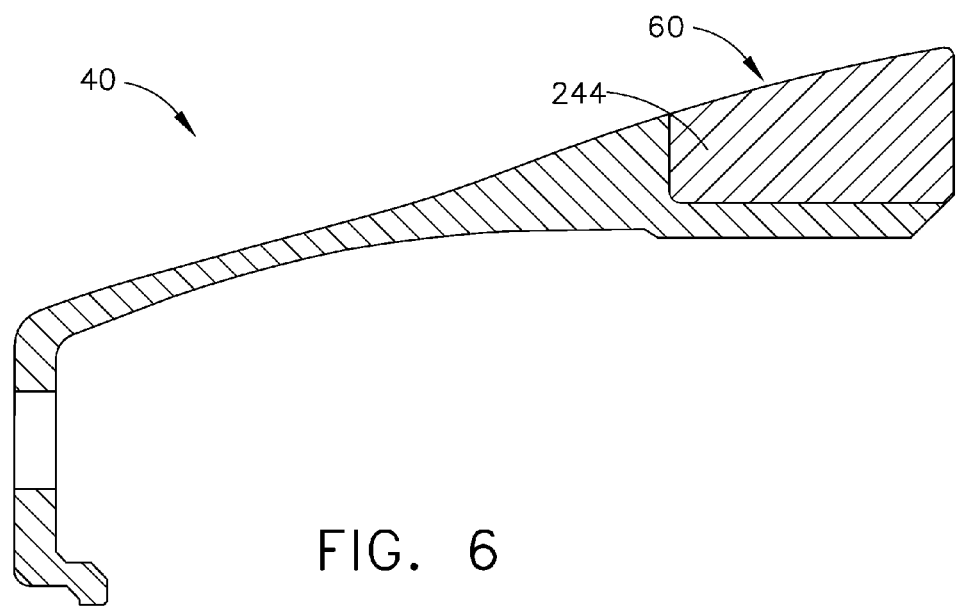
FIG. 6 is a side view of a second embodiment of the support ring of the instant disclosure.

Referring now to FIG. 6, another embodiment is depicted in side-section view. The belt 244 is mounted radially outwardly in the lug 60. Again the belt 244 has a further alternative cross-sectional shape to better match the flow surface of the support ring 40.

Figure 7:
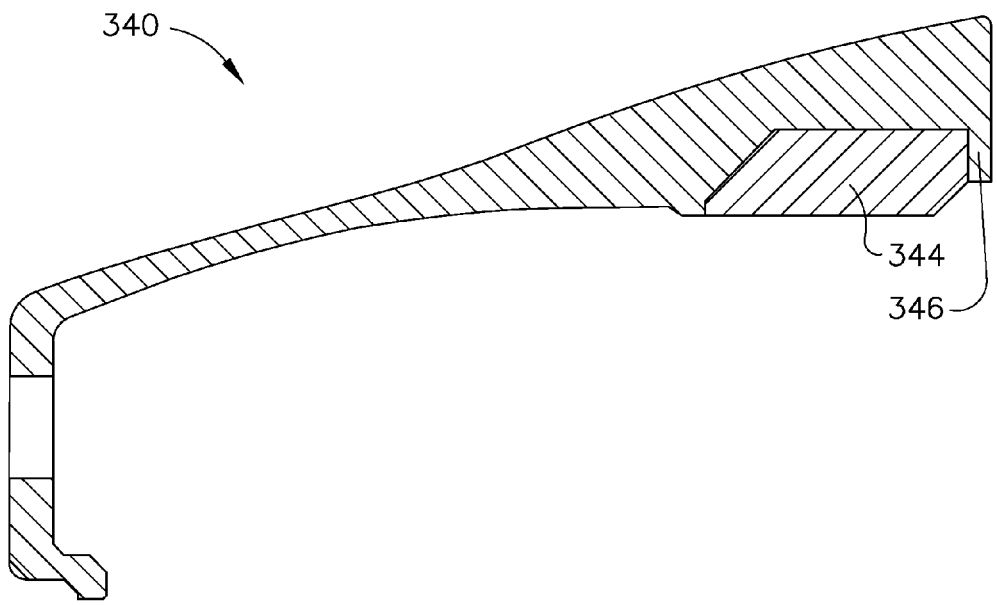
FIG. 7 is a side section view of one embodiment of the hybrid support ring with a composite belt.
Figure 8:
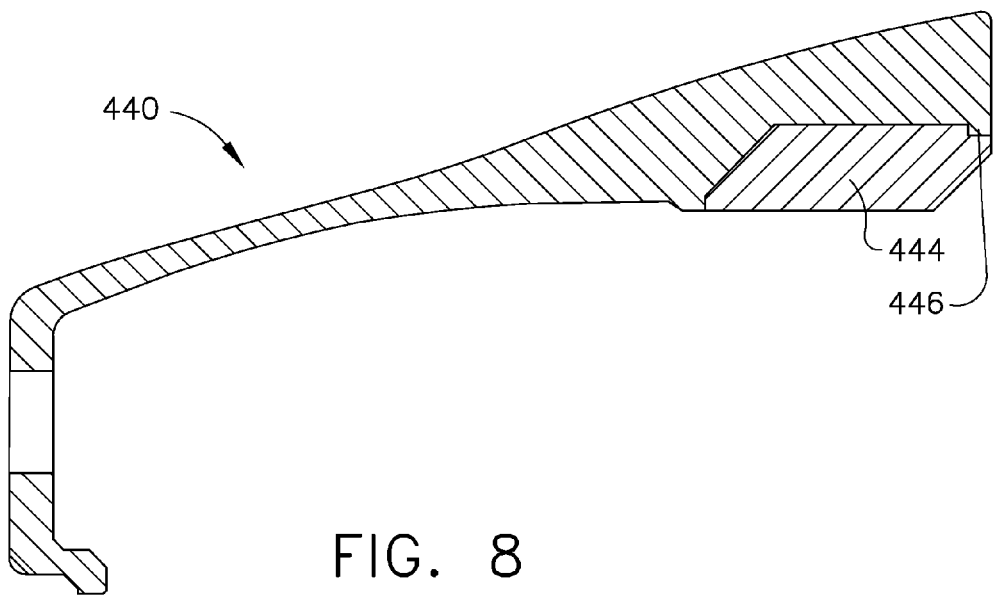
FIG. 8 is a side section view of an embodiment of the hybrid support ring with a non-composite belt.

Referring now to FIGS. 7 and 8, cross sectional views of alternate embodiments of the embodiment shown in FIG. 5 are depicted. The positioning of the belt either radially inward or radially outward may be determined for various reasons. For example, one reason may be dependent on thermal expansion and which direction a part thermally grows during operation. Another factor in determining whether to position the belt radially inward or radially outward is related to the balancing of stress concentrations. An alternate hybrid support ring 340 is depicted with the belt 344 shown at a radially inward position at the lug end of the ring 340. The belt 344 in the depicted embodiment is molded of a composite material and, therefore, a relatively longer finger 346 is depicted at an aft end of the support ring 340. The longer finger 346 may aid in molding of the belt 344 utilizing the suspender for such molding.

According to the embodiment shown in FIG. 8, a hybrid support ring 440 is depicted with a belt 444. In this embodiment various materials may be utilized for the belt 444, which is also located radially inwardly. In embodiments wherein the belt is not formed of a composite, it is anticipated that the lug may be formed with a shortened finger 446 as compared to the previous embodiment and that an interference fit or similar manufacturing connection may be utilized to aid assembly while also limiting axial movement while.

Figure 9:
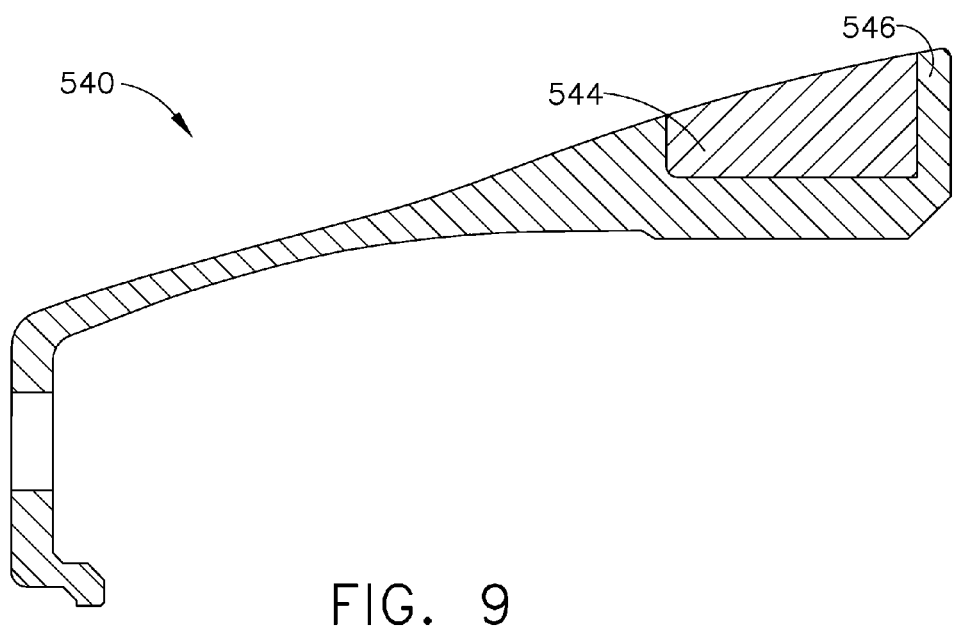
FIG. 9 is a side section view of an alternate embodiment of the hybrid support ring with a composite belt.
Figure 10:
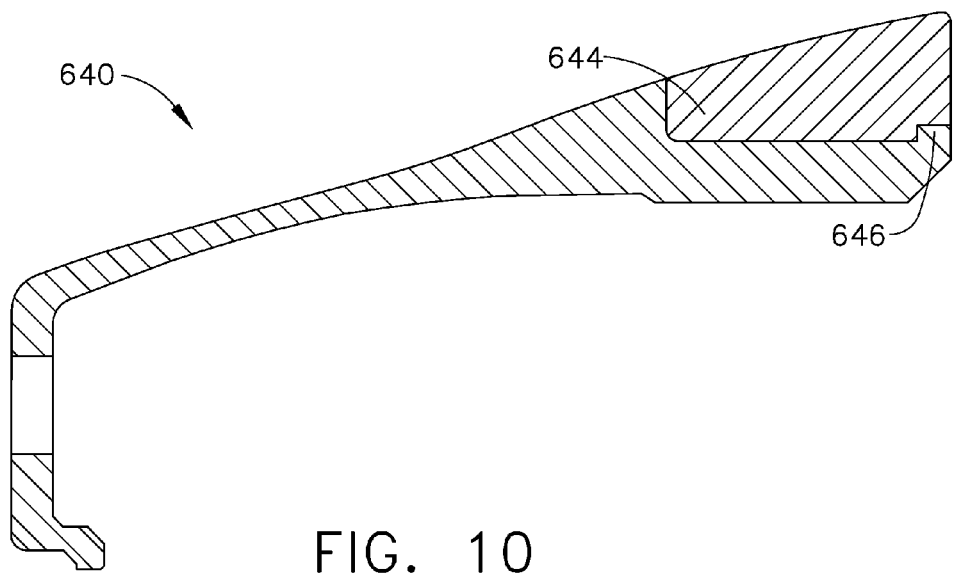
FIG. 10 is a side section view of an alternate embodiment of the hybrid support ring with a non-composite belt.

Referring now to FIGS. 9 and 10, embodiments are depicted wherein the belt is positioned in a radial outward position of the lug, corresponding to the embodiment shown in FIG. 6. With reference first to FIG. 9, a hybrid support ring 540 is depicted with the relatively longer finger 546 at an aft end thereof. In such embodiment, and as previously described, the belt 544 may be molded in place if desirable. Under such circumstances, the longer finger 546 may be beneficial to aid in the molding process of the composite belt 544.

With reference to FIG. 10, a hybrid support ring 640 is shown with a short finger 646. Similar to the previously described embodiment of FIG. 8, such short finger 646 at the aft end of the support ring may be beneficial when the belt 644 is formed of a metallic material and such suspender is heated and expanded when positioning the belt 644 in position. Thus the shortened finger 646 captures the belt 644 and limits axial movement of the belt 644 during operation. Although specific material examples are provided, they are merely exemplary and not limiting.

The foregoing description of structures and methods has been presented for purposes of illustration. It is not intended to be exhaustive or to limit the structures and methods to the precise forms and/or steps disclosed, and obviously many modifications and variations are possible in light of the above teaching. Features described herein may be combined in any combination. Steps of a method described herein may be performed in any sequence that is physically possible. It is understood that while certain forms of composite structures have been illustrated and described, it is not limited thereto and instead will only be limited by the claims, appended hereto.

While multiple inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Examples are used to disclose the embodiments, including the best mode, and also to enable any person skilled in the art to practice the apparatus and/or method, including making and using any devices or systems and performing any incorporated methods. These examples are not intended to be exhaustive or to limit the disclosure to the precise steps and/or forms disclosed, and many modifications and variations are possible in light of the above teaching. Features described herein may be combined in any combination. Steps of a method described herein may be performed in any sequence that is physically possible.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A fan section for a gas turbine aircraft engine, the fan section having a plurality of circumferentially spaced fan blades mounted to a fan rotor disk and fan platforms circumferentially located between the fan blades, a radially outer surface of the fan platforms defining part of a flow path for air between the fan blades at a radially inner end of the fan blades, the fan section further including a hybrid support ring, the hybrid support ring comprising:

a circumferentially-extending suspender having an inner surface and an outer surface, said suspender extending axially and having a forward end and a rearward end with a frusto conical leg extending between the forward end and the aft end and a forward flange extending radially inwardly from said forward end and having a plurality of apertures therein;

said suspender further including a lug which is thickened in an axial aft direction compared to forward portions of the leg and a circumferentially-extending groove in one of said inner surface and said outer surface adjacent to said rearward end; and a belt extending circumferentially in and engaging said groove of said suspender;

said suspender being formed of a first metallic material and said belt being formed of a second non-metallic composite material;

wherein said belt accepts a loading from the fan platforms.

2. The fan section of claim 1, said belt being formed of continuous wrapped composite.

3. The fan section of claim 2 further comprising chopped fiber composite.

4. The fan section of claim 1, said suspender being formed of aluminum.

5. The fan section of claim 1, said belt being interference fit in said groove.

6. The fan section of claim 1, said flange having a lower lip.

* * * * *